US007862929B2

(12) United States Patent
Kim et al.

(10) Patent No.: US 7,862,929 B2
(45) Date of Patent: Jan. 4, 2011

(54) CONSTITUTION OF THE DISPERSANT IN THE PREPARATION OF THE ELECTRODE ACTIVE MATERIAL SLURRY AND THE USE OF THE DISPERSANT (75) Inventors: Seok Koo Kim, Daejeon (KR); Cha Hun Ku, Daejeon (KR); Soon Ho Ahn, Daejeon (KR)

(73) Assignee: LG Chem, Ltd. (KR)

( * ) Notice: Subject to any disclaimer, the term of this patent is extended or adjusted under 35 U.S.C. 154(b) by 422 days.

(21) Appl. No.: 10/551,946

(22) PCT Filed: Apr. 2, 2004

(86) PCT No.: PCT/KR2004/000765

§ 371 (c)(1),
(2), (4) Date: Oct. 5, 2005

(87) PCT Pub. No.: WO2004/091017

PCT Pub. Date: Oct. 21, 2004

(65) Prior Publication Data

US 2006/0257738 A1 Nov. 16, 2006

(30) Foreign Application Priority Data

Apr. 7, 2003 (KR) .................. 10-2003-0021680

(51) Int. Cl.
*H01M 4/62* (2006.01)
*H01M 4/58* (2006.01)
(52) U.S. Cl. .................. 429/217; 429/231.4; 429/212; 429/231.8
(58) Field of Classification Search ................. 429/217, 429/231.4, 218.1, 231.95, 212, 231.8
See application file for complete search history.

(56) References Cited

U.S. PATENT DOCUMENTS

| 5,631,100 | A | 5/1997 | Yoshino et al. |
| 5,827,331 | A | 10/1998 | Block et al. |
| 6,287,723 | B1* | 9/2001 | Maeda et al. ............... 429/206 |

(Continued)

FOREIGN PATENT DOCUMENTS

EP 1 291 941 3/2003

(Continued)

OTHER PUBLICATIONS

PCT International Search Report; International application No. PCT/KR2004/000765; International filing date: Apr. 2, 2004; Date of Mailing: Jul. 20, 2004.

(Continued)

*Primary Examiner*—Stephen J. Kalafut
*Assistant Examiner*—Angela J. Martin
(74) *Attorney, Agent, or Firm*—Cantor Colburn LLP (57) ABSTRACT Disclosed are anode active material slurry for a lithium secondary cell having improved dispersibility of an anode active material and a conductive agent, and a lithium secondary cell comprising the same. Particularly, the present invention is characterized by adding a dispersant comprising a polymer backbone capable of surface-adsorption and a side-chain having non-ionic surfactant properties in a small amount, to the anode active material slurry comprising a carbon-based anode active material that is capable of lithium ion intercalation/deintercalation, a conductive agent, a binder comprising a styrene-butadiene-based polymer resin, a thickener comprising a cellulose-based or an acrylate-based resin, and water.

12 Claims, 5 Drawing Sheets

U.S. PATENT DOCUMENTS

| | | |
|---|---|---|
| 6,337,156 B1 | 1/2002 | Narang et al. |
| 6,821,675 B1 * | 11/2004 | Morigaki et al. ......... 429/218.1 |
| 7,261,972 B2 * | 8/2007 | Inada et al. ................... 429/94 |
| 2004/0191630 A1 * | 9/2004 | Kawamura et al. ..... 429/231.95 |
| 2004/0248011 A1 * | 12/2004 | Asao et al. ............. 429/231.95 |
| 2005/0008940 A1 * | 1/2005 | Adachi et al. ............... 429/327 |
| 2006/0040182 A1 * | 2/2006 | Kawakami et al. ....... 429/218.1 |

FOREIGN PATENT DOCUMENTS

| | | |
|---|---|---|
| JP | 04-342966 | 11/1992 |
| JP | 6-124708 | 5/1994 |
| JP | 06-199969 | 7/1994 |
| JP | 08-298135 | 11/1996 |
| JP | 09-147835 | 6/1997 |
| JP | 10-092436 | 4/1998 |
| JP | 11-162468 | 6/1999 |
| JP | 11-339774 | 12/1999 |
| JP | 2000-67918 | 3/2000 |
| JP | 2002203561 A1 | 7/2002 |
| JP | 2005-197073 | 7/2005 |
| KR | 2000-0014672 | 3/2000 |
| KR | 1020000014672 A * | 3/2000 |
| WO | 97/44841 | 11/1997 |
| WO | WO 99/19924 | 4/1999 |
| WO | 99/33129 | 7/1999 |

OTHER PUBLICATIONS

European Supplementary Search Report issued in the corresponding European Patent Application No. 04 725 552; Dated Jun. 2, 2009 claiming priority from Korean Patent Application No. 10-2003-0021680.

* cited by examiner

CONSTITUTION OF THE DISPERSANT IN THE PREPARATION OF THE ELECTRODE ACTIVE MATERIAL SLURRY AND THE USE OF THE DISPERSANT

This application is a national stage application of PCT/KR2004/000765, filed Apr. 2, 2004, which claims the benefit of the filing date of Korean Patent Application No. 2003-0021680, filed Apr. 7, 2003, in the Korean Property Office, the disclosure of which is incorporated herein in its entirety by reference.

TECHNICAL FIELD

The present invention relates to anode active material slurry having improved dispersibility of an anode active material and a conductive agent, and a lithium secondary cell comprising the same.

BACKGROUND ART

In general, a secondary cell using non-aqueous electrolyte solution comprises an anode, a cathode, and a non-aqueous electrolyte layer. In order to form a cathode, cathode slurry comprising a lithium-transition metal oxide as a cathode active material, polyvinylidene fluoride (PVdF) as a binder and N-methyl-2-pyrrolidone (NMP) as a solvent is prepared, the cathode slurry is coated on a collector made of a metal foil, and then drying, pressing and molding steps are performed. In order to form an anode, the same method as described above is performed, except that anode slurry comprising carbon or carbon composite capable of lithium ion intercalation/deintercalation as an anode active material, polyvinylidene fluoride (PVdF) as a binder and N-methyl-2-pyrrolidone (NMP) as a solvent is used.

However, when polyvinylidene fluoride (PVdF) is used as a binder, the interfacial adhesion between a collector and an electrode active material and the close adhesion among the electrode active material molecules is low, and thus the electrode active material pressed and adhered to the collector may be separated and removed from the collector, when a coated electrode is cut to conform to a desired product size, e.g., by slitting, thereby causing the decrease of a nominal voltage or the irregularity of a cell capacity.

Additionally, repeated charge/discharge cycles of a cell may cause the separation and removal of an electrode active material by the shrink and expansion of an electrode. Accordingly, as charge/discharge cycles are repeated, the removal of the electrode active material from a collector is accelerated, thereby causing the decrease of a cell capacity. Moreover, a high-voltage state such as overcharge, or a temperature increase resulting from the high-voltage state may cause the decomposition of polyvinylidene fluoride (PVdF) to generate hydrogen fluoride, and thus generated hydrogen fluoride may cause a side reaction with the active material on the surface of the collector or a trace amount of metal lithium precipitates.

In addition to the above-mentioned problems, because polyvinylidene fluoride has a high crystallization degree, it has to be added in an amount of 2.5 wt % or more based on the total weight of the anode active material in order to prevent the removal of the active material in a cutting or punching step. Such an increased proportion of the binder to the total weight of the anode active material results in the decrease of the proportion of the active material, thereby causing the decrease of a full cell capacity.

Accordingly, as a solution to solve the above-mentioned problems, an electrode using a rubber-based binder such as a styrene-butadiene rubber (SBR) has been investigated. An SBR-based binder provides the same degree of effect as PVdF, even though it is used in an amount smaller than PVdF, and is electrochemically stable. When an SBR-based binder is used, it can be dispersed in water, so that water may be used as a solvent for electrode active material slurry, and thus it is environmental-friendly.

Meanwhile, viscosity control is essential to a coating process. In a coating process, a viscosity, a solid content, a coating layer thickness, a coating speed, a solvent evaporation speed and a solvent evaporation amount are organically related with one another. Therefore, when an SBR-based binder is used, a thickener is used to control the viscosity of electrode slurry. More particularly, a cellulose-based thickener such as carboxymethyl cellulose (CMC) has been investigated. The use of a styrene-butadiene rubber (SBR) as a binder and the use of a cellulose-based polymer as a thickener help to decrease the danger of a cell explosion and to increase a cell capacity. Additionally, the use of a thickener inhibits the settling of solid contents so that constant viscosities in the upper and lower parts of a solution and a uniform dispersion state in the solution may be retained for a long time and the viscosity of slurry may be stabilized.

However, the electrode active material slurry using the aforesaid binder and thickener has difficulties in dispersion thereof due to the difference of the specific gravity of the electrode active material and those of the binder and thickener. Therefore, the viscosity becomes difficult to control and to maintain with times, and the diffusion effect of carbon black used as a conductive agent becomes poor, thus adversely affecting the mixing with the active material, so that uniform distributions of the active material and the conductive agent over the whole surfaces of the electrode may not be obtained, thereby causing coating problems.

Because CMC (carboxymethyl cellulose) has some dispersion effect, when the amount of CMC (carboxymethyl cellulose) is increased, it is possible to improve the deterioration of the diffusion effect of carbon black and to solve the dispersion-related problems. However, in this case, the weight ratio of CMC per weight of the active material is increased, and thus the weight ratio of the active material is reduced. This results in the reduction of a cell capacity and the deterioration of cell properties. Additionally, the viscosity is increased due to the increase of the amount of a thickener to such a degree that cannot be applied in a practical process, and thus water as a solvent is added to adjust the viscosity, thereby causing the reduction of solid contents.

DISCLOSURE OF THE INVENTION

Accordingly, the present invention has been made to solve the above-mentioned problems occurring in the prior art, and an object of the present invention is to solve the dispersion-related problems by adding a very small amount of a specific dispersant without changing the solid contents and the amount of a thickener.

In order to accomplish this object, there is provided anode active material slurry comprising:

(a) a carbon-based anode active material, that is capable of lithium ion intercalation/deintercalation;

(b) a conductive agent;

(c) a binder comprising a styrene-butadiene-based polymer resin;

(d) a thickener comprising a cellulose-based or an acrylate-based resin;

(e) a dispersant comprising a polymer backbone capable of surface-adsorption and a side-chain having non-ionic surfactant properties; and (f) water.

There is also provided a lithium secondary cell comprising an anode obtained by using the anode active material slurry.

The present invention is characterized by using a dispersant comprising a polymer backbone capable of surface-adsorption combined with a side-chain having non-ionic surfactant properties, in anode active material slurry of a lithium secondary cell.

The present invention will be explained in detail hereinafter.

According to the present invention, as an anode active material, artificial graphite, natural graphite, fiber graphite, crystalline carbon or amorphous carbon formed of carbon or carbon composite capable of lithium ion intercalation/deintercalation may be used. The amount of the anode active material in the anode active material slurry ranges from 50 wt % to 99 wt %, preferably from 90 wt % to 97 wt %.

As a conductive agent, acetylene black or graphite may be used. The amount of the conductive agent in the anode active material slurry ranges from 0.01 wt % to 10 wt %, preferably from 0.1 wt % to 3 wt %.

Preferably, the styrene-butadiene-based polymer resin used as a binder according to the present invention is at least one resin selected from the group consisting of styrene-butadiene rubbers (SBR), modified acrylonitrile-butadiene rubbers, in which 2 to 10 of cyano groups are substituted with carboxylic groups, polychloroprene, polyisobutylene butyl rubbers, ethylene-propylene methyl ether, polyperfluorobutyl acrylate and polyhexafluoropropylene oxide.

The styrene-butadiene-based polymer resin is preferably used in an amount of from 0.5 to 10 wt %, and more preferably from 1 to 3 wt % based on the total weight of the anode active material slurry.

As a thickener, an acrylic polymer and a cellulose-based polymer may be used. Acrylic polymers include polyvinyl pyrrolidone (PVP), polyvinyl alcohol, etc., and cellulose-based polymers include hydroxyethyl cellulose (HEC), hydroxypropyl cellulose (HPC), ethylhydroxyethyl cellulose (EHEC), methyl cellulose (MC), hydroxyalkyl methyl cellulose, etc.

The amount of the thickener in the anode active material slurry ranges from 0.01 wt % to 10 wt %, preferably from 0.1 wt % to 3 wt %.

Meanwhile, a conventional dispersant including a surfactant participates in a point-contact, in which the adsorption surface is very small, and the adsorption is accomplished between materials having the same surface properties. Generally, the adsorption using the same surface properties is a chemical adsorption, which occurs by transfer of electrons on surfaces, followed by interactions with ions or electron sharing.

However, a carbon-based material such as graphite, acetylene black or carbon black, which is used as an anode active material for a lithium ion secondary cell, or a carbon-based conductive agent such as carbon black has no surface activities, i.e., hydrophilicity or hydrophobicity. Therefore, a conventional dispersant such as an anionic surfactant, a cationic surfactant, an amphoionic surfactant, or an amphoteric surfactant showing charges by a solution pH is not expected to provide any effects.

Figure 1:
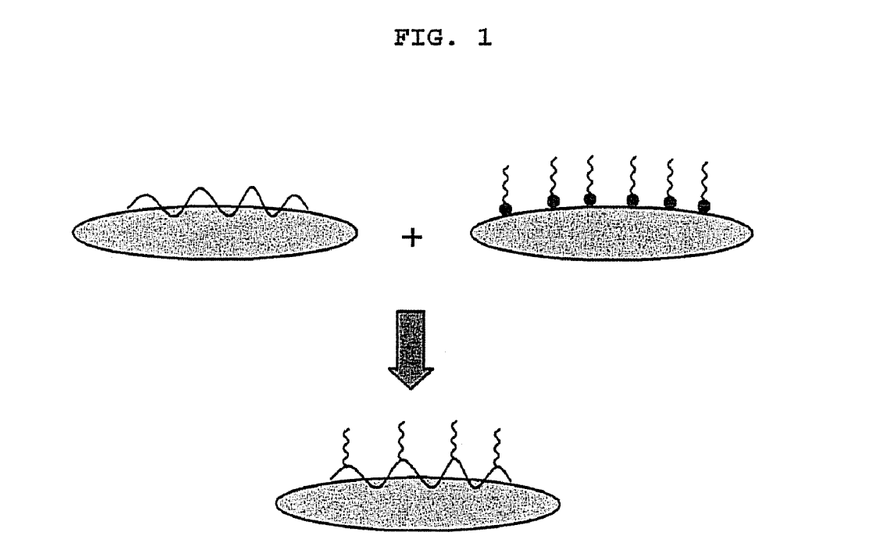
FIG. 1 is a schematic view of a functional mechanism for a dispersant comprising a polymer backbone capable of surface-adsorption combined with a side-chain having non-ionic surfactant properties, according to the present invention.
Figure 2:
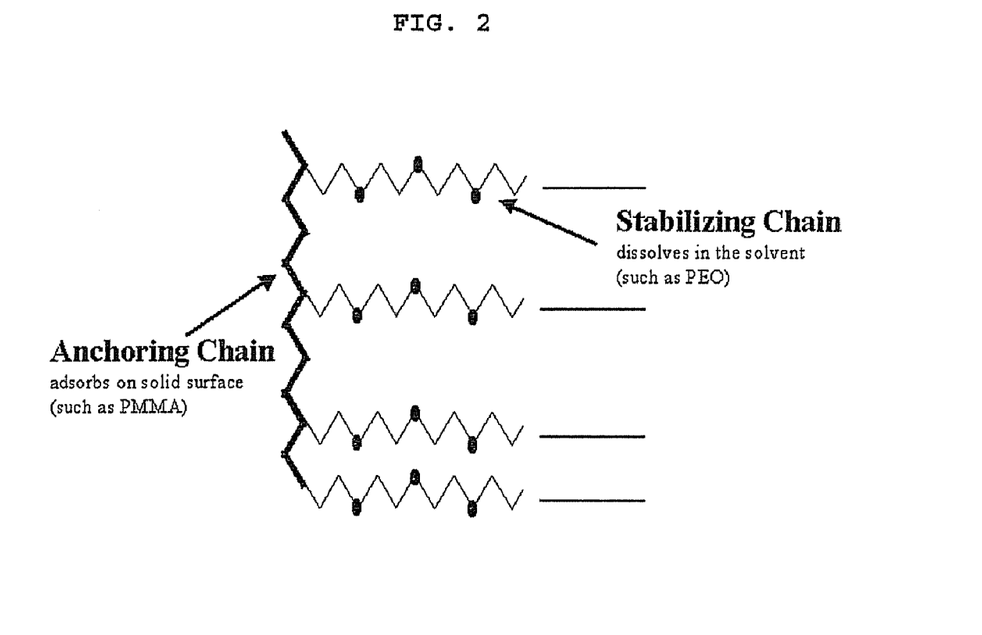
FIG. 2 is a schematic view of one example of a dispersant comprising a polymer backbone (PMMA) capable of surface-adsorption combined with a side-chain (PEO) having a non-ionic surfactant property, according to the present invention.

Accordingly, for the purpose of improving the dispersion properties of the said inert carbon-based anode active material and/or carbon-based conductive agent, the present invention is characterized by using a dispersant comprising a polymer backbone capable of physically bonding, i.e., adsorption, to the surface of carbon, combined with a side-chain having surfactant properties required for dispersion, in the same molecule (see FIG. 1 and FIG. 2).

The polymer backbone in the dispersant according to the present invention is a part, which can be participated somewhat in a physical bonding even with an inert surface by using a physical adsorption phenomenon caused by Van der waals force. While a conventional dispersant has a very small adsorption surface as in the case of a point-contact, the polymer backbone in the dispersant used in the present invention has a large adsorption surface, so that it permits surface adsorption even with an inert material. The adsorption capability depends on the molecular weight, i.e., surface area of the polymer backbone.

Non-limiting examples of the polymer backbone include an acrylic polymer such as polymethylmethacrylate (PMMA), polyvinylidene fluoride (PVdF), etc., and PMMA is preferable in order to maximize the adsorption surface to the surface of the anode active material.

The only factor that affects the dispersant of the present invention is its surface area, and thus the dispersant of the present invention can be used for dispersing any materials having no surface active groups other than a carbon-based active material or a conductive agent. This is also included in the scope of the present invention.

The side-chain preferably has non-ionic surfactant properties. Materials showing electrochemically positive or negative charges have a great possibility to affect the action of a cell through any paths, and thus electrochemically inert, i.e., non-ionic materials are preferable to be used in a cell. However, a side-chain having ionic properties can be used in the present invention, as long as it is stable in the range of effective cell voltages (0 to 4.5 V vs. Li/Li$^+$). This is also included in the scope of the present invention.

Meanwhile, non-limiting examples of the side-chain having non-ionic surfactant properties in the dispersant according to the present invention include the following:

[Ether-Type]

alkyl- and alkylaryl-polyoxyethylene ethers, akylaryl-formaldehyde-condensated polyoxyethylene ethers, and block polymers having polyoxypropylene as an oleophilic group.

[Esterether-Type]

polyoxyethylene ethers of glycerin ester, polyoxyethylene ethers of sorbitan ester, and polyoxyethylene ethers of sorbitol ester.

[Ester-Type]

polyethyleneglycol fatty acid esters, glycerin esters, sorbitan esters, propyleneglycol esters, and sugar esters.

[Amide-Type]

fatty acid alkanol amides, polyoxyethylene fatty acid amides, polyoxyethylene alkylamines and amine oxides.

Other materials that can be used as the side-chain having non-ionic surfactant properties include alcohol ethoxylates, polyethylene oxide (PEO-based materials), alkyl phenol ethoxylates, fatty amine ethoxylates, amine oxides, glucosides, ethylene oxide-propylene oxide copolymers, alkanolamides, etc. See [R. Grant & C. Grant, Chemical Dictionary, McGraw Hill Book Company, 1987].

In order to bonding the side-chain to the polymer backbone, a conventional graft polymerization method may be used.

Preferably, the dispersant is a copolymer as shown in FIG. 2, such as Hypermer available from Unichema, in which the copolymer comprises PMMA (polymethyl-methacrylate) as a backbone (a part to be adsorbed) and PEO (polyethylene oxide) as a side-chain for imparting dispersibility.

When the dispersant according to the present invention is added to the solution of electrode slurry in a small amount, it is possible to improve the dispersibility of the electrode active material by the dispersant and to increase the ratio of solid contents under the same viscosity.

Additionally, when the dispersant according to the present invention is added to the solution of electrode slurry in a small amount, it is possible to reduce the amount of a thickener such as CMC, and to prevent the difficulties in viscosity control, the reduction of dispersibility and the deterioration of coating properties.

The said dispersant is preferably added in an amount of from 0.01 wt % to 10 wt %, and more preferably from 0.1 wt % to 1 wt %, based on the total weight of the anode active material slurry (solid contents).

Preferably, the weight average molecular weight of the dispersant is in the range of from 10,000 to 30,000.

Meanwhile, the dispersion effect depends on the kind of the side-chain and the substitution degree of the side-chain in the case of a substituted side-chain. Also, the dispersibility and surface adsorption property depend on the length (molecular weight) of the backbone.

Considering the viscosity control in a process for coating an electrode, it is preferable that the solid content of the anode active material slurry is 30 wt % to 70 wt % and the coating layer thickness is 50 μm to 200 μm.

According to the present invention, in order to form an anode of a cell, the anode active material slurry of the present invention is coated on a collector and water as a solvent is removed by, e.g., drying the active material in order to adhere it to the collector and to closely adhere the active material molecules among themselves. Although there is no particular limitation as long as the collector is formed of a conductive material, the collector is preferably formed of a metal such as iron, copper, aluminum and nickel.

A lithium secondary cell, to which the anode according to the present invention can be applied, preferably comprises a lithium-transition metal composite oxide capable of lithium intercalation/deintercalation as a cathode active material. The cathode active material may be represented by the following formula 1:

$$Li_xMO_2 \quad \text{[formula 1]}$$

wherein, M is Ni, Co or Mn, and x is a number satisfying $0.05 \leq x \leq 1.10$.

The cathode active material slurry may comprise a binder for providing an adhesion force in the cathode active material itself, for example, PVDF (polyvinylidene fluoride), NBR (acrylonitrile-butadiene rubber) and SBR (styrene-butadiene rubber). For the purpose of improving conductivity, a conductive agent such as acetylene black or graphite may be used. Also, an organic solvent such as NMP, acetone, DMA and DMF and an inorganic solvent such as water may be used.

The separator used in the lithium secondary cell of the present invention may be a separator formed of a porous membrane, such as PE (polyethylene), PP (polypropylene) and PE/PP/PE, and the electrolyte solution comprises an aprotic organic solvent in which a lithium salt such as $LiClO_4$ or $LiPf_6$ is dissolved. The organic solvent may include a cyclic carbonate and a linear carbonate. The cyclic carbonate includes, for example, ethylene carbonate (EC), propylene carbonate (PC) and gamma-butyrolactone, and the linear carbonate includes, for example, diethyl carbonate (DEC), dimethyl carbonate (DMC), ethylmethyl carbonate (EMC) and methylpropyl carbonate (MPC).

The lithium secondary cell according to the present invention is manufactured by a conventional method, i.e., by inserting a porous separator between a cathode and an anode and introducing an electrolyte solution.

Preferably, the lithium secondary cell according to the present invention has the shape of a cylindrical can, an angular cell or a pouch.

BEST MODE FOR CARRYING OUT THE INVENTION

Reference will now be made in detail to the preferred embodiments of the present invention. It is to be understood that the following examples are illustrative only and the present invention is not limited thereto.

Example 1

First, CMC powder (0.26 g; about 1 wt %) used as a thickener for the solution of electrode active material slurry was dissolved in 12.5 g of distilled water at 50° C. to prepare CMC solution. Next, 25 g (about 97 wt %) of graphite powder used as an electrode active material was introduced into a mortar, the CMC solution prepared in advance was poured gradually, and then stirred with a pestle for about 10 minutes. After completion of stirring, 0.51 g (about 1.9 wt %) of SBR solution used as a binder was introduced into the mortar and stirred for additional 5 minutes. Finally, 0.026 g (about 0.1 wt %) of PEO-PMMA copolymer (available from Unichema in the name of Hypermer) used as a dispersant was added and stirred, while adding 43.5 g of distilled water gradually. And then, the solid content of the electrode active material slurry was adjusted to 43 wt %.

Figure 3:
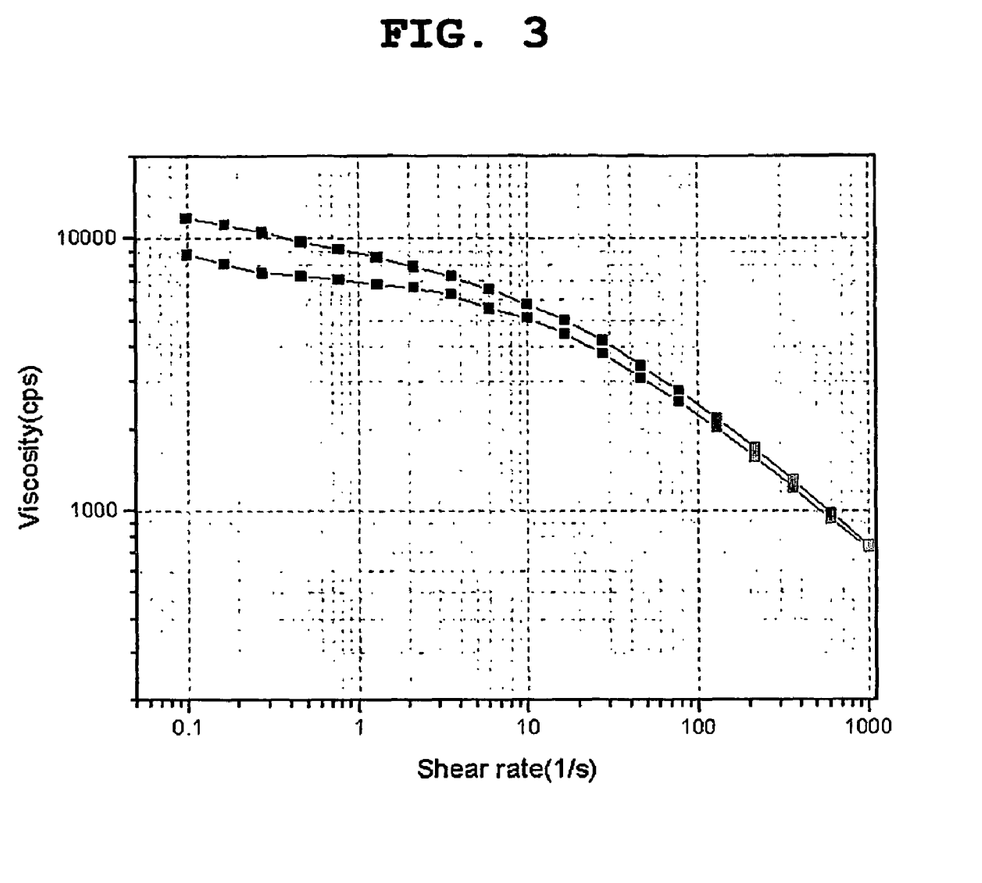
FIG. 3 is a viscosity profile of the anode active material slurry obtained in Example 1.

The viscosity change for the electrode active material slurry prepared as the above was measured by using Thermo Hakke RS1 viscometer at 30° C. under a shear rate ranged from 0.1 to 1000 (l/s). The results are shown in FIG. 3.

Comparative Example 1

Electrode slurry was prepared as described in Example 1, except that the dispersant was not added. The viscosity was measured under the same range of shear rates at 30° C. The results are shown in FIG. 4.

[Analysis for the Results]

As shown in FIG. 3 showing the viscosity of Example 1, the graph takes a form in which a viscosity decreases substantially with the same slope, as a shear rate increases. Also, substantially identical viscosity profiles are shown both in the case of increasing the shear rate and in the case of decreasing the shear rate. As can be seen from the foregoing, there was no change in the viscosity of the electrode slurry under the same shear rate.

Figure 4:
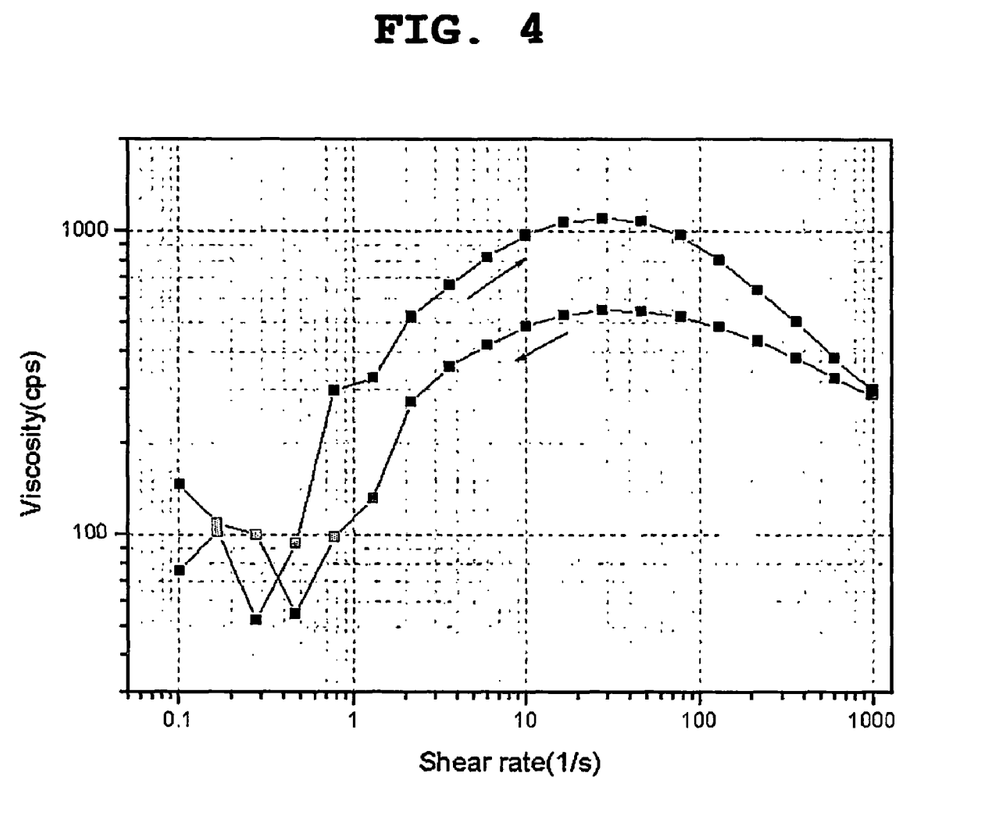
FIG. 4 is a viscosity profile of the anode active material slurry obtained in Comparative Example 1.

However, as shown in FIG. 4, in the case of the anode active material slurry of Comparative Example 1 without using a dispersant, the graph takes a form in which a viscosity has a maximum under a shear rate of 10 (l/s) and decreases again, as a shear rate increases. On the other hand, as a shear rate decreases, a hysteresis phenomenon is shown, wherein a viscosity profile different from that in the case of increasing the shear rate is obtained. Therefore, it seems that the electrode slurry was poorly dispersed. Additionally, when the slurry of Comparative Example 1 was coated in an anode foil, the physical properties of the slurry were so poor that clogging of masses and settling of the coating slurry caused by poor dispersion were generated to the extent that it is impossible to coat.

Comparative Example 2

Figure 5:
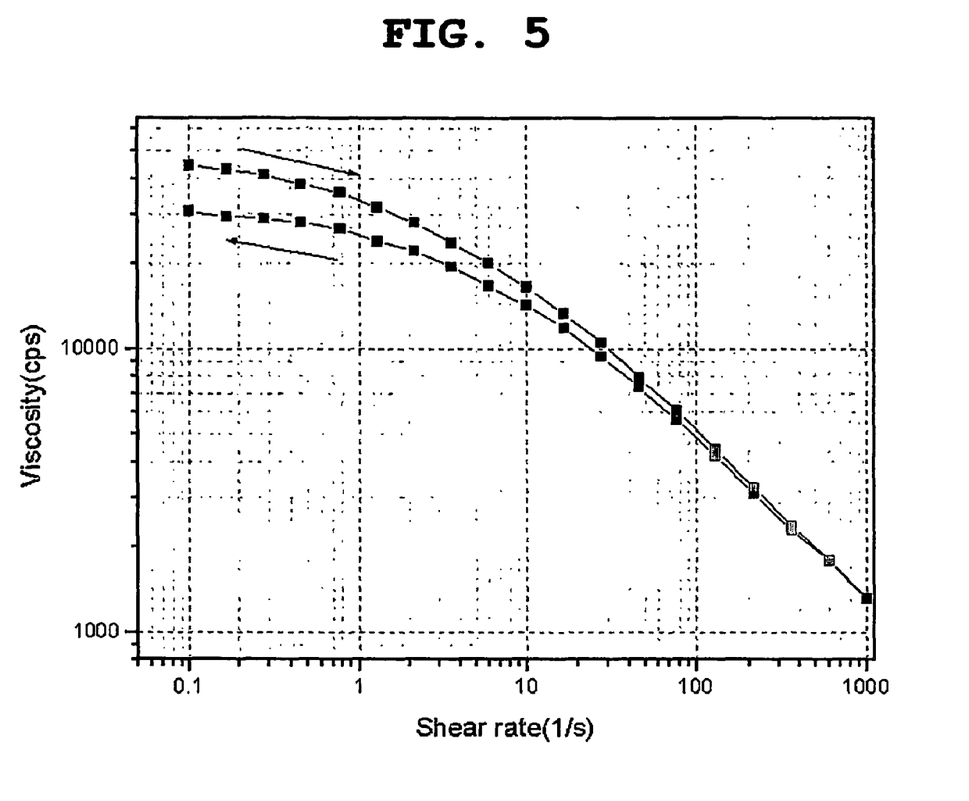
FIG. 5 is a viscosity profile of the anode active material slurry obtained in Comparative Example 2.

Electrode slurry was prepared as described in Example 1, except that the amount of CMC used as a thickener is increased by 2 wt %, i.e., from 1 wt % to 3 wt % and PEO-PMMA copolymer used as a dispersant was not added. The viscosity was measured under the same range of shear rates. The results are shown in FIG. 5.

When the amount of CMC was increased from 1 wt % to 3 wt % without adding a dispersant, a viscosity profile similar to that of Example 1 was shown, and thus it seems that the electrode slurry was well dispersed.

[Experiment on Cell Performance]

Each of Anode slurries obtained from Example 1 and Comparative Example 2 was applied and coated on a copper foil to form an anode. $LiCoO_2$ as a cathode active material, PE/PP/PE as a separator and EC/PC/DEC, in which $LiPF_6$ was dissolved, as an electrolyte solution were used to manufacture a can-type lithium secondary cell. An experiment for measuring a cell capacity vs. a charge/discharge rate was performed. The results are shown in FIG. 6.

Figure 6:
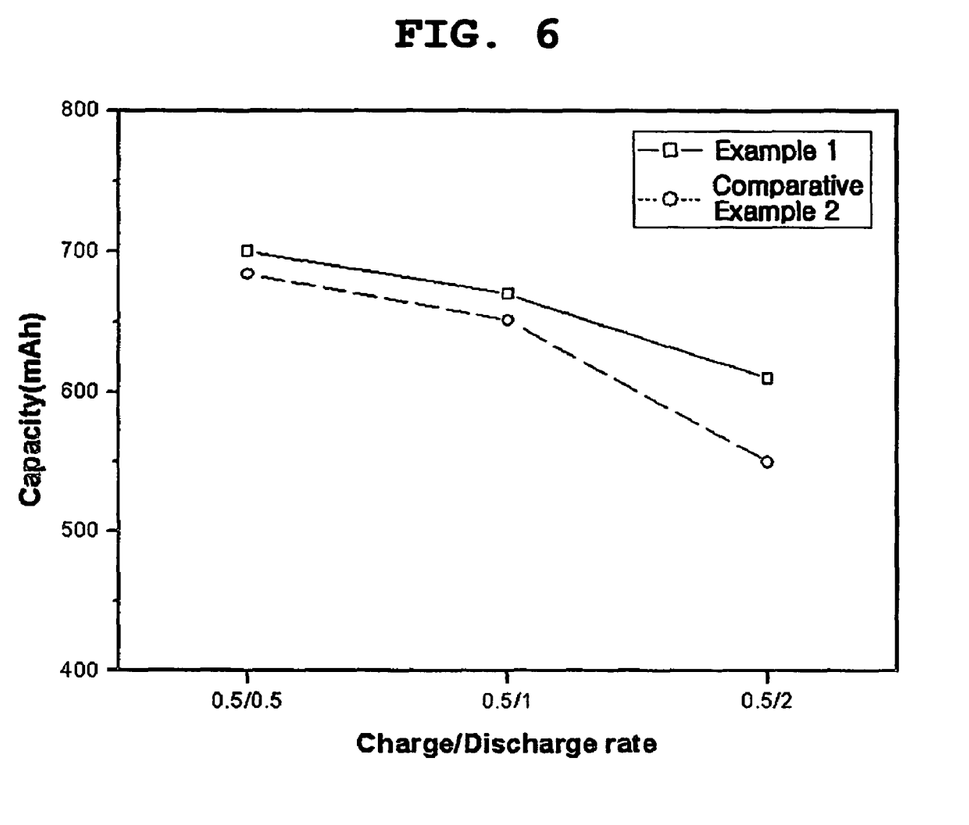
FIG. 6 is a cell performance profile for each of lithium secondary cells obtained by using the anode active material slurries prepared from Example 1 and Comparative Example 2.

As can be seen from FIG. 6, the anode slurry obtained from Comparative Example 2 had an increased weight ratio of CMC used as a thickener based on the total weight of the anode-forming components, compared to Example 1, and thus the weight ratio of the anode active material was reduced and the theoretical capacity of the lithium secondary cell was also reduced.

INDUSTRIAL APPLICABILITY

As described above, according to the present invention, by adding a specific dispersant to electrode active material slurry in a small amount, it is possible to improve the dispersibility of electrode active material slurry, to stabilize the viscosity of electrode active material slurry, to distribute an active material and a conductive agent uniformly, to decrease the amount of a thickener, to increase the solid content ratio of an electrode active material, and to increase a cell capacity.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. Anode active material slurry comprising:
   (a) a carbon-based anode active material, that is capable of lithium ion intercalation/deintercalation;
   (b) a conductive agent;
   (c) a binder comprising a styrene-butadiene-based polymer resin;
   (d) a thickener comprising a cellulose-based or an acrylate-based resin;
   (e) a dispersant comprising a polymer backbone having surface-adsorption properties and a side-chain having non-ionic surfactant properties; and
   (f) water.

2. The anode active material slurry according to claim 1, wherein the content of the dispersant ranges from 0.01 wt % to 10 wt % based on the total weight of the anode active material slurry (solid content).

3. The anode active material slurry according to claim 1, wherein the polymer backbone in the dispersant is polymethylmethacrylate (PMMA) or polyvinylidene fluoride (PVdF).

4. The anode active material slurry according to claim 1, wherein the side-chain having non-ionic surfactant properties in the dispersant is at least one selected from the group consisting of alkyl- and alkylaryl-polyoxyethylene ethers, akylarylformaldehyde-condensated polyoxyethylene ethers, block polymers having polyoxypropylene as an oleophilic group, polyoxyethylene ethers of glycerin ester, polyoxyethylene ethers of sorbitan ester, polyoxyethylene ethers of sorbitol ester, polyethyleneglycol fatty acid esters, glycerin esters, sorbitan esters, propyleneglycol esters, sugar esters, fatty acid alkanol amides, polyoxyethylene fatty acid amides, polyoxyethylene alkylamines, amine oxides, alcohol ethoxylates, polyethylene oxide (PEO-based materials), alkyl phenol ethoxylates, fatty amine ethoxylates, glucosides, ethylene oxide-propylene oxide copolymers and alkanolamides.

5. The anode active material slurry according to claim 1, wherein the dispersant is a copolymer formed of polymethylmethacrylate and polyethylene oxide.

6. The anode active material slurry according to claim 1, wherein the dispersant has a weight average molecular weight ranged from 10,000 to 30,000.

7. A lithium secondary cell comprising an anode obtained by using the anode active material slurry according to claim 1.

8. The lithium secondary cell according to claim 7, wherein the content of the dispersant ranges from 0.01 wt % to 10 wt % based on the total weight of the anode active material slurry (solid content).

9. The lithium secondary cell according to claim 7, wherein the polymer backbone in the dispersant is polymethylmethacrylate (PMMA) or polyvinylidene fluoride (PVdF).

10. The lithium secondary cell according to claim 7, wherein the side-chain having non-ionic surfactant properties in the dispersant is at least one selected from the group consisting of alkyl- and alkylaryl-polyoxyethylene ethers, akylarylformaldehyde-condensated polyoxyethylene ethers, block polymers having polyoxypropylene as an oleophilic group, polyoxyethylene ethers of glycerin ester, polyoxyethylene ethers of sorbitan ester, polyoxyethylene ethers of sorbitol ester, polyethyleneglycol fatty acid esters, glycerin esters, sorbitan esters, propyleneglycol esters, sugar esters, fatty acid alkanol amides, polyoxyethylene fatty acid amides, polyoxyethylene alkylamines, amine oxides, alcohol ethoxylates, polyethylene oxide (PEO-based materials), alkyl phenol ethoxylates, fatty amine ethoxylates, glucosides, ethylene oxide-propylene oxide copolymers and alkanolamides.

11. The lithium secondary cell according to claim 7, wherein the dispersant is a copolymer formed of polymethylmethacrylate and polyethylene oxide.

12. The lithium secondary cell according to claim 7, wherein the dispersant has a weight average molecular weight ranged from 10,000 to 30,000.

* * * * *